(12) United States Patent
Kuwabara

(10) Patent No.: US 7,615,185 B2
(45) Date of Patent: Nov. 10, 2009

(54) MULTICOMPONENT CERAMICS POWDER, METHOD OF MANUFACTURING MULTICOMPONENT CERAMICS POWDER, SINTERED BODY, AND METHOD OF MANUFACTURING SINTERED BODY

(75) Inventor: Mitsuo Kuwabara, Tsurugashima (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 134 days.

(21) Appl. No.: 12/000,406

(22) Filed: Dec. 12, 2007

(65) Prior Publication Data

US 2008/0251962 A1    Oct. 16, 2008

Related U.S. Application Data

(62) Division of application No. 10/482,485, filed as application No. PCT/JP02/06483 on Jun. 27, 2002, now Pat. No. 7,326,273.

(30) Foreign Application Priority Data

Jul. 3, 2001  (JP) ............... 2001-202139
Jul. 3, 2001  (JP) ............... 2001-202198

(51) Int. Cl.
*B22F 3/12*  (2006.01)
*C22C 29/00* (2006.01)

(52) U.S. Cl. ............... 419/45; 419/46; 419/57; 501/96.1; 423/364; 148/514

(58) Field of Classification Search ............ 419/45, 419/46, 57; 423/364; 501/96.1; 148/514
See application file for complete search history.

(56) References Cited

U.S. PATENT DOCUMENTS

| | | |
|---|---|---|
| 3,704,115 A | 11/1972 | Wastenson et al. |
| 3,994,692 A | 11/1976 | Rudy |
| 4,120,719 A | 10/1978 | Nomura et al. |
| 4,212,671 A | 7/1980 | Ettmayer et al. |
| 4,300,952 A | 11/1981 | Ingelstrom et al. |
| 4,769,070 A | 9/1988 | Tobioka et al. |
| 5,030,038 A | 7/1991 | Ariura et al. |
| 5,053,074 A | 10/1991 | Buljan et al. |
| 5,476,530 A * | 12/1995 | Gries et al. ............ 75/238 |
| 6,037,066 A | 3/2000 | Kuwabara et al. |
| 2004/0035246 A1 | 2/2004 | Kuwabara et al. |
| 2005/0053510 A1 | 3/2005 | Kuwabara et al. |

FOREIGN PATENT DOCUMENTS

| | | |
|---|---|---|
| DE | 2 137 761 A | 3/1972 |
| DE | 198 00 689 C1 | 7/1999 |
| JP | 58-171562 A | 10/1983 |
| JP | 58-199778 A | 11/1983 |
| JP | 61-247673 A | 11/1986 |
| JP | 61-264142 A | 11/1986 |
| JP | 62-288169 A | 12/1987 |
| JP | 63-270818 A | 11/1988 |
| JP | 05171335 A | 7/1993 |

OTHER PUBLICATIONS

Zeller, Werner; Franke, Alexander: Das physikalische Rustzeug des Ingenieurs. 11th Edition, vol. 11, Leipzig: VEB Fachbuchverlag, 1977, pp. 87,88.
Schatt, Werner; Pulvermerallurgie Sinter- und Verbundwerkstoffe, 1st Edition, Leipzig: VEB Deutscher Verlag fur Grundstoffindustrie, 1979, pp. 25, 26, 39, 44, 45.
Kawakami, Mamoru, "Complete Edition of Metal Surface Engeneering vol. 14, Heat Treatment for Metal Surface Hardening", pp. 127, 130, 142 issued by Makishoten, Dec. 25, 1971, Tokyo, JP.

* cited by examiner

*Primary Examiner*—Roy King
*Assistant Examiner*—Ngoclan T Mai
(74) *Attorney, Agent, or Firm*—Birch, Stewart, Kolasch & Birch LLP

(57) ABSTRACT

After an alloy powder including W, Cr, at least one of Ti, Zr, and Hf, and at least one of V, Nb, and Ta is produced, the alloy powder, a powdery carbon material, and a catalyst are heat-treated in the presence of a nitrogen gas. The alloy powder is carbonitrided into a multicomponent ceramics powder, and sintered into a sintered body. Alternatively, a powder of a first substance including at least two of Ti, Al, V, Nb, Zr, Hf, Mo, Ta, Cr, and W is molded into a molded body. Then, the surface of the molded body is surrounded by a second substance including a metal element which is not contained in the powder of the first substance, and the molded body is heat-treated in an atmosphere in which N is present. A porous sintered body thus produced is crushed into a multicomponent ceramics powder.

11 Claims, 12 Drawing Sheets

FIG. 3

| | No. | COMPOSITION RATIO (WEIGHT %) OF MULTICOMPONENT CARBONITRIDE POWDER | | | | | | | | | | | SINTERED BODY | |
|---|---|---|---|---|---|---|---|---|---|---|---|---|---|---|
| | | W | Cr | Ti | Zr | Hf | V | Nb | Ta | Al | N | C | Hv | YOUNG'S MODULUS (GPa) |
| INVENTIVE EXAMPLE | 1 | 89.7 | 1.0 | 0.5 | | | 0.9 | | | | 0.3 | 6.1 | 3120 | 650 |
| | 2 | 61.5 | 0.5 | 12.0 | | | | 14.3 | | | 4.6 | 5.1 | 3400 | 560 |
| | 3 | 61.3 | 0.5 | 10.2 | 2.0 | | | 14.3 | | | 4.9 | 4.8 | 2600 | 570 |
| | 4 | 61.4 | 0.5 | 10.1 | | 2.0 | | 14.3 | | | 4.4 | 5.3 | 3100 | 580 |
| | 5 | 64.6 | 0.5 | 9.9 | | | 10.0 | | | | 4.1 | 4.4 | 3200 | 570 |
| | 6 | 62.4 | 0.5 | 10.1 | | | | | 4.5 | | 3.8 | 4.7 | 3000 | 560 |
| | 7 | 62.1 | 1.0 | 10.0 | | | | | 16.5 | | 3.8 | 4.8 | 3100 | 550 |
| | 8 | 59.7 | 3.0 | 10.0 | | | | | 16.3 | | 3.9 | 4.9 | 3100 | 540 |
| | 9 | 57.3 | 5.1 | 10.1 | | | | | 16.5 | | 4.0 | 5.0 | 3100 | 520 |
| | 10 | 59.2 | 3.1 | 10.0 | 2.0 | | | | 16.5 | | 4.1 | 5.0 | 3000 | 530 |
| | 11 | 59.2 | 3.0 | 10.0 | | 2.0 | | | 2.5 | | 4.1 | 5.0 | 3200 | 550 |
| | 12 | 59.2 | 3.0 | 10.0 | | | 10.0 | 3.1 | 2.5 | | 4.2 | 5.1 | 3300 | 550 |
| | 13 | 71.2 | 0.5 | 7.0 | | | | 10.4 | 1.4 | | 2.0 | 6.9 | 3000 | 610 |
| | 14 | 71.1 | 1.0 | 7.0 | | | | 9.0 | 1.0 | | 2.0 | 6.9 | 3000 | 570 |
| | 15 | 71.8 | 3.0 | 7.0 | | | | 5.2 | 2.0 | | 2.1 | 6.9 | 2800 | 550 |
| | 16 | 71.5 | 5.0 | 7.0 | | | | 3.7 | 2.0 | | 2.1 | 6.9 | 2700 | 520 |
| | 17 | 71.5 | 7.0 | 6.9 | | | | 1.6 | 2.0 | | 2.1 | 6.8 | 2600 | 510 |
| | 18 | 71.5 | 5.0 | 7.0 | 2.0 | | | 3.5 | 2.0 | | 2.2 | 6.9 | 2400 | 520 |
| | 19 | 70.0 | 1.0 | 7.0 | 2.0 | | | 7.0 | 2.0 | | 2.1 | 6.9 | 2700 | 540 |
| | 20 | 62.1 | 1.0 | 15.0 | 2.0 | | | 5.0 | 5.0 | | 3.9 | 4.0 | 2900 | 550 |
| | 21 | 59.0 | 3.0 | 15.0 | 2.0 | | | 5.0 | 5.0 | | 3.9 | 4.1 | 3000 | 560 |
| | 22 | 57.8 | 5.0 | 15.1 | 2.0 | | | 6.0 | 5.0 | | 4.0 | 4.1 | 3100 | 560 |
| | 23 | 80.1 | 0.5 | 3.0 | | | | | 2.0 | 0.3 | 2.9 | 4.5 | 3100 | 580 |
| | 24 | 80.5 | 1.0 | 3.0 | | | | | 2.0 | 1.0 | 3.0 | 4.5 | 3100 | 540 |
| | 25 | 56.0 | 0.5 | 15.1 | 3.0 | | | 13.5 | | 0.7 | 7.1 | 3.5 | 3500 | 630 |
| | 26 | 62.1 | 1.0 | 15.0 | | | | 6.1 | 1.8 | 1.7 | 7.3 | 3.7 | 3200 | 620 |
| | 27 | 57.0 | 2.3 | 15.0 | 2.0 | | | | 14.1 | | 6.5 | 3.2 | 3500 | 640 |
| | 28 | 57.0 | 1.5 | 10.1 | 1.0 | | 1.2 | | 12.3 | 3.1 | 6.8 | 3.0 | 2200 | 490 |
| COMPARATIVE EXAMPLE | 1 | 53.2 | 0.5 | | | 11.6 | | | 26.4 | | 0.9 | 5.4 | 1750 | 450 |
| | 2 | 54.3 | 0.5 | 1.0 | | 10.0 | | | 26.0 | | 1.2 | 5.1 | 1850 | 470 |
| | 3 | 55.2 | 7.0 | 10.1 | | | | | 16.6 | | 4.0 | 5.1 | 2100 | 480 |
| | 4 | 55.1 | 7.2 | 10.2 | | | | | 16.5 | | 4.0 | 5.1 | 1940 | 470 |

MULTICOMPONENT CERAMICS POWDER, METHOD OF MANUFACTURING MULTICOMPONENT CERAMICS POWDER, SINTERED BODY, AND METHOD OF MANUFACTURING SINTERED BODY

This application is a Divisional of application Ser. No. 10/482,485 filed on Dec. 31, 2003 now U.S. Pat. No. 7,326,273, which claims priority on PCT International Application No. PCT/JP02/06483 filed on Jun. 27, 2002, which claims priority on Japanese Application Nos. JP2001-202139 and JP2001-202198 both filed on Jul. 3, 2001. The entire contents of each of these applications is hereby incorporated by reference.

TECHNICAL FIELD

The present invention relates to a multicomponent ceramics powder comprising several metal elements, N, and occasionally C, as its constituent elements, a method of manufacturing such a multicomponent ceramics powder, a sintered body, and a method of manufacturing a sintered body.

BACKGROUND ART

Composites manufactured by sintering a metal powder and a ceramics powder together are highly tough because of the metal and highly hard and strong because of the ceramics, and are widely used in various applications. For example, WC—Co cemented carbide produced by sintering tungsten carbide (WC) and cobalt (Co) and TiC cermet produced by sintering titanium carbide (TiC) and cobalt (Co) are used as cutting edges of cutters. Niobium carbide (NbC) is occasionally mixed with the above materials.

Ceramic powders for use as materials of composites comprises two-component carbide ceramics comprising a metal element such as WC, TiC, NbC, etc. and C as constituent elements, and two-component nitride ceramics comprising a metal element such as TiN or the like and N as constituent elements. While these ceramics are sufficiently hard themselves, harder ceramics are required in some applications.

Harder materials include diamond, cubic boron nitride (c-BN), etc., for example. In recent years, it has been reported that a thin film of Ti—Al—N three-component ceramics comprising Ti, Al, and N as constituent elements is as hard as c-BN. Specifically, the hardness of Ti—Al—N three-component ceramics is much higher than TiN or AlN, and higher than a sintered body of TiN and AlN.

A thin film of Ti—Al—N three-component ceramics may be manufactured by physical vapor deposition (PVD) or chemical vapor deposition (CVD).

Diamond and c-BN are disadvantageous in that they are not highly oxidization-resistant, are expensive, and hence cause an increase in the cost of manufacture of composites comprising diamond and c-BN. In order to produce a chemically stable, highly hard composite at a low cost, it is effective to use, as the material thereof, a multicomponent ceramics powder comprising two or more metal elements and C or N as constituent elements, such as Ti—Al—N three-component ceramics.

However, Ti—Al—N three-component ceramics has been produced in the form of a thin film by PVD or CVD, and a powder of Ti—Al—N three-component ceramics has not been reported in the art so far.

Attempts to manufacture a multicomponent ceramics powder according to PVD or CVD result in an increase in the cost of manufacture of composites comprising such a multicomponent ceramics powder. The reason for an increase in the cost is that the efficiency with which to produce a multicomponent ceramics powder is low because the PVD and CVD processes have a low reaction efficiency and a low reaction rate. These processes are also problematic in that they need to experimentally determine reactive conditions to produce a powder, and hence are time-consuming and complex.

Another process of producing a Ti—Al—N three-component ceramics powder would be to nitride a mixed powder of Ti and Al. However, the process produces only a mixed powder of TiN and AlN, and fails to manufacture a Ti—Al—N three-component ceramics powder.

Another proposal would be to nitride a Ti—Al two-component alloy. However, the Ti—Al two-component alloy has its surface oxidized by oxygen in the air and hence covered with an oxide film. Since the oxide film makes it extremely difficult to nitride the Ti—Al two-component alloy deeply in its inner structure, the hardness of a composite made of a powder of the produced nitrided Ti—Al two-component alloy is not appreciably increased.

As described above, much difficulty has been experienced in the manufacture of a multicomponent ceramics powder comprising two or more metal elements and C or N as constituent elements, and such a multicomponent ceramics powder has not been available in the art.

DISCLOSURE OF THE INVENTION

It is a major object of the present invention to provide a multicomponent ceramics powder from which it is possible to produce a sintered body that is harder and tougher than a sintered body made of two-component ceramics, a method of manufacturing such a multicomponent ceramics powder, a sintered body made of such a multicomponent ceramics powder, and a method of manufacturing such a sintered body.

According to an aspect of the present invention, there is provided a multicomponent ceramics powder comprising, as constituent components, 56 through 92 weight % of W, 0.5 through 7 weight % of Cr, at least one material selected from the group consisting of Ti, Zr, and Hf, at least one material selected from the group consisting of V, Nb, and Ta, 0.3 through 8.2 weight % of N, and C, and an inevitable impurity of O having a proportion of at most 0.5 weight %.

The multicomponent ceramics powder is a powder of a carbonitride of five or more components represented by W—Cr—Ti—V—N—C or W—Cr—Ti—Zr—V—Nb—N—C, for example.

A sintered body made of the above multicomponent ceramics powder is higher in hardness and toughness than, and as strong and rigid as, a sintered body made of two-component ceramics such as WC, NbC, or the like. Therefore, the sintered body made of the multicomponent ceramics powder has hardness and toughness increased without sacrificing strength and rigidity.

According to another aspect of the present invention, there is provided a method of manufacturing a multicomponent ceramics powder, comprising the steps of mixing a powder of a substance comprising W as a constituent component, a powder of a substance comprising Cr as a constituent component, at least one of powders of substances comprising Ti, Zr, and Hf as constituent components, at least one of powders of substances comprising V, Nb, and Ta as constituent components, a powdery carbon material added in a proportion ranging from 3.0 to 11.5 weight % with respect 100 weight % of the above materials, and a catalyst for promoting carbonitridation, to produce, by way of mechanical alloying, an alloy powder comprising W, at least one of Ti, Zr, and Hf, and at least one of V, Nb, and Ta, as constituent components, and heat-treating a mixed powder containing the alloy powder in the presence of a nitrogen gas to carbonitride the alloy powder into a multicomponent ceramics powder.

In the above manufacturing method, when the mixed powder is heat-treated, an oxide film present on the surface of the alloy powder is reduced by the powdery carbon material. Therefore, the surface of the alloy powder is highly activated. The alloy powder can thus be greatly carbonitrided easily and simply from its surface to inner structure. Consequently, the multicomponent ceramics powder can be manufactured at a low cost.

When the oxide film is reduced, the powdery carbon material is oxidized into CO or $CO_2$ by depriving the oxide film of oxygen. Since CO or $CO_2$ is in a gaseous phase, it can easily and quickly be discharged out of the reaction furnace.

According to still another aspect of the present invention, there is provided a sintered body containing at least 65 weight % of multicomponent ceramics comprising, as constituent components, 56 through 92 weight % of W, 0.5 through 7 weight % of Cr, at least one material selected from the group consisting of Ti, Zr, and Hf, at least one material selected from the group consisting of V, Nb, and Ta, 0.3 through 8.2 weight % of N, and C, and an inevitable impurity of O having a proportion of at most 0.5 weight %.

The sintered body according to the present invention includes a sintered body produced by sintering only a multicomponent ceramics powder of five or more components, and a composite produced by sintering together such a multicomponent ceramics powder and a metal powder.

The sintered body is as strong and rigid as, and much harder and tougher than, a sintered body made of two-component ceramics such as WC, NbC, or the like.

According to yet another aspect of the present invention, there is provided a method of manufacturing a multicomponent ceramics powder comprising, as constituent elements, at least two metal elements selected from the group consisting of Ti, Al, V, Nb, Zr, Hf, Mo, Ta, Cr, and W, and N, comprising the steps of molding a powder containing a powder of a first substance comprising either one of Ti, Al, V, Nb, Zr, Hf, Mo, Ta, Cr, and W as a constituent element, into a molded body, heating the molded body, which is being held in contact with a second substance comprising, as a constituent element, a metal element which is either one of Ti, Al, V, Nb, Zr, Hf, Mo, Ta, Cr, and W and which is not contained in the powder of the first substance, in an atmosphere in which N is present, to diffuse the metal element as the constituent element of the second substance into the first substance and to compound the constituent element of the first substance with N, for thereby turning the molded body into a porous sintered body of multicomponent ceramics containing, as constituent elements, the metal element of the first substance, the metal element of the second substance, and N, and crushing the porous sintered body to turn the multicomponent ceramics into a powder.

The multicomponent ceramics powder manufactured by the above method is a multicomponent ceramics powder of three or more components, which comprises at least two metal elements and N as constituent elements.

In the above manufacturing method, the metal element as the constituent element of the second substance is diffused into the first substance and the constituent element of the first substance is compounded with N, for thereby producing multicomponent ceramics of three or more components. The multicomponent ceramics is crushed into a multicomponent ceramics powder.

If metal elements as constituent elements of multicomponent ceramics are of the same type, then a sintered body made of carbonitride ceramics is of higher hardness than a sintered body made of nitride ceramics. Therefore, the multicomponent ceramics should preferably contain C as a constituent element. In this case, the manufactured multicomponent ceramics powder is a multicomponent ceramics powder of four or more components, which comprises at least two metal elements, N, and C as constituent elements.

In order to produce a carbonitride (multicomponent ceramics) powder containing C as a constituent element, the molded body may be heated in the presence of a powdery carbon material to compound the metal element of the first substance with C.

According to yet still another aspect of the present invention, there is provided a method of manufacturing a sintered body containing multicomponent ceramics comprising, as constituent elements, at least two metal elements selected from the group consisting of Ti, Al, V, Nb, Zr, Hf, Mo, Ta, Cr, and W, and N, comprising the steps of molding a powder containing a powder of a first substance comprising either one of Ti, Al, V, Nb, Zr, Hf, Mo, Ta, Cr, and W as a constituent element, into a molded body, and heating the molded body, which is being held in contact with a second substance comprising, as a constituent element, a metal element which is either one of Ti, Al, V, Nb, Zr, Hf, Mo, Ta, Cr, and W and which is not contained in the powder of the first substance, in an atmosphere in which N is present, to diffuse the metal element as the constituent element of the second substance into the first substance and to compound the constituent element of the first substance with N, for thereby sintering the molded body into a sintered body containing multicomponent ceramics comprising, as constituent elements, the constituent element of the first substance, the constituent element of the second substance, and N.

In the above manufacturing method, the molded body is directly sintered into a sintered body containing multicomponent ceramics of three or more components.

When manufacturing a sintered body, as when manufacturing a multicomponent ceramics powder, the molded body may be sintered in the presence of a powdery carbon material to produce a carbonitride (multicomponent ceramics) powder containing C as a constituent element.

The sintered body made of the above multicomponent ceramics powder is higher in hardness than a sintered body made of two-component ceramics such as TiN, TiC, NbC, WC, or the like. The relative density of the sintered body is close to an ideal density, so that the sintered body exhibits high strength and high toughness.

The above and other objects, features, and advantages of the present invention will become more apparent from the following description when taken in conjunction with the accompanying drawings in which preferred embodiments of the present invention are shown by way of illustrative example.

BRIEF DESCRIPTION OF THE DRAWINGS

FIG. 3 is a table showing the composition ratios of components of sintered bodies according to Inventive Examples 1 through 28 and Comparative Examples 1 through 4;

BEST MODE FOR CARRYING OUT THE INVENTION

Figure 1:
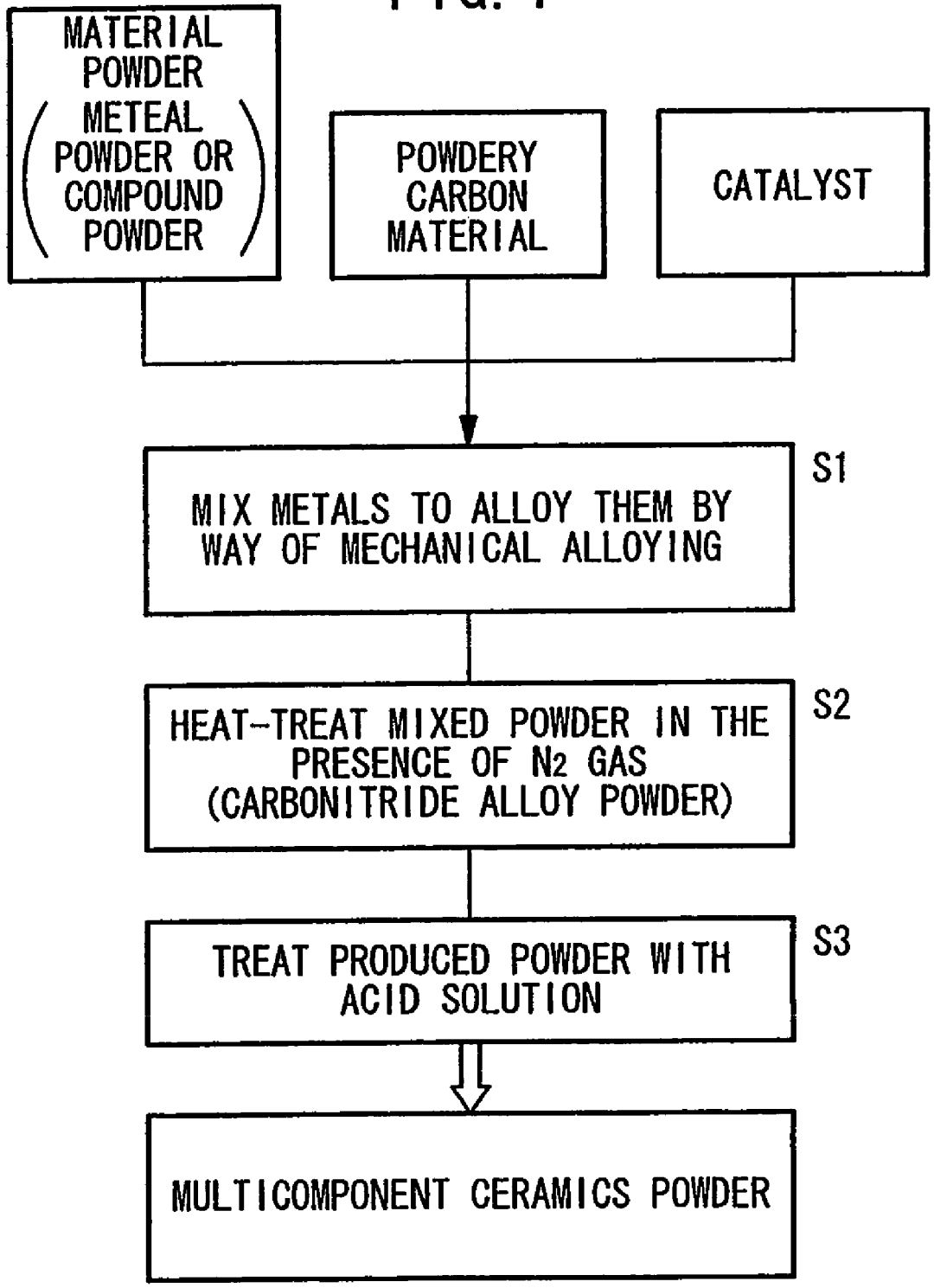
FIG. 1 is a flowchart of a method of manufacturing a multicomponent ceramics powder according to a first embodiment of the present invention.

Preferred embodiments of a multicomponent ceramics powder and a method of manufacturing such a multicomponent ceramics powder, a sintered body, and a method of manufacturing a sintered body according to the present invention will be described with reference to drawings.

A multicomponent ceramics powder which comprises five or more components and a method of manufacturing such a multicomponent ceramics powder, according to a first embodiment of the present invention, will be described below in reference to a sintered body made of such a multicomponent ceramics powder.

The sintered body is made of a powder of a carbonitride comprising six or more components including at least W, Cr, a material selected from the group consisting of Ti, Zr, and Hf, a material selected from the group consisting of V, Nb, and Ta, N, and C. The carbonitride thus comprises at least four metal elements, N, and C as constituent elements.

W is a major component of the multicomponent ceramics powder. As well known in the art, W has a large atomic weight and hence gives a high specific gravity to the multicomponent ceramics powder. A sintered body made of a powder with a high specific gravity exhibits a high tensile strength and a high fatigue strength. This is because the high specific gravity of the powder makes sintered particles difficult to vibrate when stresses are applied to the sintered body, greatly suppressing the propagation of stress waves. The specific gravity of the multicomponent ceramics powder should preferably be 10 or higher. Since W is highly rigid, it is effective to increase the rigidity of the sintered body.

The proportion or composition ratio of W in the multicomponent ceramics powder is set to a value ranging from 56 weight % to 92 weight %. If the proportion of W were less than 56 weight %, then the specific gravity of the multicomponent ceramics powder would be too low to make the sintered body strong and rigid enough. If the proportion of W were in excess of 92 weight %, then the hardness of the sintered body would be insufficient.

Cr serves to increase the corrosion resistance and oxidization resistance of the multicomponent ceramics powder. The increase in the corrosion resistance and oxidization resistance can definitely be recognized at high temperatures because the energy required to dissociate Cr, C, and N is large, making the multicomponent ceramics powder highly stable chemically.

As the oxidization resistance of the sintered body is increased, when an electric discharge machining process is performed on the sintered body to machine the sintered body into a mold, the thickness of an oxidization-modified layer formed on the sintered body by the electric discharge machining process is very small. The oxidization-modified layer whose thickness is very small can easily be removed from the sintered body. In some applications, the sintered body may be used without the need for removal of the oxidization-modified layer from the sintered body.

The proportion or composition ratio of Cr in the multicomponent ceramics powder is set to a value ranging from 0.5 weight % to 7 weight %. If the proportion of Cr were less than 0.5 weight %, then it would be less effective to increase the corrosion resistance and oxidization resistance of the multicomponent ceramics powder. If the proportion of Cr were in excess of 7 weight %, then the rigidity and strength of the sintered body would be lowered.

Ti, Zr, and Hf form intermetallic compounds (alloys) with W and Cr in a wide composition range. Ti, Zr, or Hf forms chemically stable nitrides with N. Therefore, W—Cr—Ti alloys, for example, can easily be nitrided. Thus, Ti, Zr, or Hf serves as a component for making it easy for N to be compounded.

The preferred proportions of Ti, Zr, and Hf in the multicomponent ceramics powder are different from each other. Specifically, if only Ti among these materials is used, then the proportion of Ti is set to a value ranging from 0.5 weight % to 32 weight %. If only Zr among these materials is used, then the proportion of Zr is set to a value ranging from 1 weight % to 38 weight %. If only Hf among these materials is used, then the proportion of Hf is set to a value ranging from 2 weight % to 42 weight %. If the proportions of Ti, Zr, and Hf were smaller than the above ranges, then the proportion of N in the multicomponent ceramics powder would be reduced, making the sintered body not strong and tough enough. If the proportions of Ti, Zr, and Hf were greater than the above ranges, then since the proportions of W and other elements would be comparatively reduced, the sintered body would have poor hardness and rigidity.

If two or more of Ti, Zr, and Hf, e.g., Ti and Zr, are used, their proportions may be smaller than the above ranges. For example, the proportion or composition ratio of Ti may be 0.5 weight %, and the proportion or composition ratio of Zr may be 0.5 weight %. Briefly stated, if two or more of Ti, Zr, and Hf are used, then their proportions may be set to such values that the toughness, hardness, and rigidity of the sintered body are maintained at desired levels.

V, Nb, and Ta serve as components for increasing the hardness and toughness of the sintered body. Specifically, V, Nb, and Ta form a solid solution with both W, Cr and Ti, Zr, Hf and are strongly bonded with them, making the sintered body highly hard. The solid solution of the above materials increases the proportion of N that can be compounded. Consequently, the toughness of the sintered body is increased.

The preferred proportions of V, Nb, and Ta in the multicomponent ceramics powder are different from each other. Specifically, if only V among these materials is used, then the proportion of V is set to a value ranging from 0.5 weight % to 11 weight %. If only Nb among these materials is used, then the proportion of Nb is set to a value ranging from 1.2 weight % to 20 weight %. If only Ta among these materials is used, then the proportion of Ta is set to a value ranging from 2 weight % to 39 weight %. If the proportions of V, Nb, and Ta were smaller than the above ranges, then the strength and toughness of the sintered body are reduced. If the proportions of V, Nb, and Ta were greater than the above ranges, then the sintered body would have poor rigidity.

If two or more of V, Nb, and Ta, e.g., V and Nb, are used, their proportions may be smaller than the above ranges. For example, the proportion or composition ratio of V may be 0.5 weight %, and the proportion or composition ratio of Nb may be 1.0 weight %. Briefly stated, if two or more of V, Nb, and Ta are used, then their proportions may be set to such values that the toughness, hardness, and rigidity of the sintered body are maintained at desired levels.

It is preferable to add 3.0 weight % or less of Al as a constituent element in addition to the metal elements described above. If Al is present, then an inevitable impurity of O is compounded with Al. Therefore, oxidization of W, Ti, Zr, Hf, V, Nb, and Ta is greatly suppressed, resulting in a further increase in the hardness, strength, toughness, and hardness of the sintered body. If the proportion or composition ratio of Al exceeded 3.0 weight %, then the hardness, strength, toughness, and hardness of the sintered body would be lowered.

N is supplied from a nitrogen gas contained in an atmosphere gas that is used in heat-treating a powder of an alloy comprising, as constituent elements, Cr, at least one material selected from the group consisting of Ti, Zr, and Hf, and at least one material selected from the group consisting of V, Nb, and Ta. As described later on, when the alloy is heated in the presence of a powdery carbon material and a nitrogen gas, a multicomponent carbonitride ceramics powder is produced.

The proportion or composition ratio of N is set to a value ranging from 0.3 weight % to 8.2 weight %. If the proportion of N fell outside of the above range, then the hardness of the sintered body would be lowered.

C is supplied from a powdery carbon material as described above. If a multicomponent ceramics powder containing C as a constituent element is used as a raw material, then a highly hard sintered body can be produced.

The multicomponent ceramics powder contains O as an inevitable impurity. The proportion or composition ratio of O is set to a value equal to or smaller than 0.5 weight %. If the proportion of O were in excess of 0.5 weight %, then the hardness and strength of the sintered body might possibly be lowered.

The sintered body according to the first embodiment may comprise a sintered body produced by sintering the above multicomponent ceramics powder only. The sintered body thus produced is much more excellent in hardness, strength, and rigidity than a sintered body made of a two-component ceramics powder of W, C, or the like. Specifically, whereas the Vickers harness of a WC sintered body is about 1800, the Vickers harness of a sintered body produced by sintering a W—Cr—Ti—Zr—Nb—Al—C—N ceramics powder is 2800 or higher.

The sintered body according to the first embodiment may alternatively comprise a composite produced by sintering the multicomponent ceramics powder and a metal powder. The metal powder may be a powder of Fe, Ni, or Co which is a general material of a composite mold or a composite cutting tool, or a powder of an alloy comprising at least one of these metals as a constituent element. The sintered body thus produced is much more excellent in hardness, strength, and rigidity than a composite which comprises ceramics and a metal at the same proportions.

If the sintered body comprises a composite, then the proportion of the multicomponent ceramics in the sintered body is set to a value equal to or higher than 65 weight %. If the proportion of the multicomponent ceramics were less than 65 weight %, then since the proportion of the multicomponent ceramics would be relatively small, the hardness, strength, and rigidity of the sintered body would be reduced.

The multicomponent ceramics powder which the sintered body is made of can be manufactured as follows:

FIG. 1 shows a flowchart of a method of manufacturing the multicomponent ceramics powder according to the first embodiment of the present invention. The method of manufacturing the multicomponent ceramics powder comprises a mechanical alloying step S1 of mixing a material powder, a powdery carbon material, and a catalyst, a heat treatment step S2 of heat-treating a mixed powder, and an acid treatment step S3 of processing a multicomponent ceramics powder produced in the heat treatment step S2 with an acid solution.

In the mechanical alloying step S1, a material powder, a powdery carbon material, and a catalyst are mixed into a mixed powder.

The material powder comprises a powder of a substance containing W as a constituent component, a powder of a substance containing Cr as a constituent component, a powder of at least one of substances containing T, Zr, and Hf as constituent components, and a powder of at least one of substances containing V, Nb, and Ta as constituent components. Stated otherwise, the material powder contains a W source, a Cr source, at least one of a Ti source, a Zr source, and an Hf source, and at least one of a V source, an Nb source, and a Ta source.

The W source may be W itself, i.e., a powder of W or a powder of a compound of W. Any of the other metal element sources may be a powder of pure metal or a powder of a compound of metal. The compound should preferably be a compound that can easily be oxidized or reduced in the heat treatment step S2. For example, the compound may be a hydrogen compound such as hydrogenated titanium, hydrogenated vanadium, or the like.

W of the W source, Cr of the Cr source, at least one of Ti of the Ti source, Zr of the Zr source, and Hf of the Hf source, and at least one of V of the V source, Nb of the Nb source, and Ta of the Ta source, which are contained in the material powder, can easily form an alloy by mechanical alloying.

If Al is to be added as a further constituent component of the multicomponent ceramics powder, then a substance containing Al as a constituent component, i.e., an Al source, may be added to the above material powder. The Al source may be an Al powder, for example. The proportion of the added Al source is equal to or less than 3 weight %. If the proportion of the added Al source were greater than 3 weight %, then since the proportion or composition ratio of Al in the multicomponent ceramics powder would exceed 3 weight %, all of the hardness, strength, toughness, and rigidity of the sintered body would be lowered.

The powdery carbon material serves as a C source of multicomponent ceramics. On the other hand, the powdery carbon material reduces an oxide film formed on the surfaces of the W source, the Cr source, the Ti source, the Zr source, the Hf source, the V source, the Nb source, the Ta source, and the Al source. Specifically, the surface of these metals or hydrogenated components is covered with an oxide film produced when the surface is oxidized by oxygen in the air. The powdery carbon material reduces the oxide film by being oxidized itself in the heat treatment step S2.

The proportion of the added powdery carbon material is set to a value ranging from 0.1 weight % to 11.6 weight %. If the proportion of the added powdery carbon material were less than 0.1 weight %, then the powdery carbon material would not be capable of enough as a reducing agent. If the proportion of the added powdery carbon material exceeded 11.6 weight %, then free carbon would be generated. With the Al powder added, $Al_4C_3$ would also be generated. The sintered body containing $Al_4C_3$ would be poor in hardness and toughness.

The catalyst serves to promote carbonitridation of an alloy comprising the above metal elements as constituent components. Preferred examples of the catalyst include alkali earth metals, VIIA-group elements, and VIII-group elements. Of these elements, it is preferable to use VIIA-group elements or VIII-group elements because they can easily be eluted into an acid solution in the acid treatment step S3, making it possible to produce a highly pure multicomponent ceramics powder. Fe, Co, and Ni are examples of VIII-group elements, and Mn is an example of a VIIA-group element. Of these metals, Mn is preferable as it is the most effective to promote nitridation or carbonitridation of the above metal elements.

The preferred proportion of the catalyst is not uniquely determined as it varies from catalyst type to catalyst type. For example, if Mn is used as the catalyst, then its proportion should preferably be 3 weight % or less, and if Fe, Co, or Ni is used as the catalyst, then its proportion should preferably be 5 weight % or less. If the catalyst were added in excess of the above proportion, then the amount of an unreacted catalyst or the amount of a generated nitride or carbonitride would be increased. Since it is not easy to elute these materials in the acid treatment step S3, it would not be easy to increase the hardness of the sintered body.

The catalyst may alternatively comprise a compound rather than the pure materials of alkali earth metals, VIIA-group elements, and VIII-group elements. For example, Fe and Ni powders may be replaced with powders of carbonyl iron and carbonyl nickel. These compound powders have much smaller particle diameters than pure material powders. Since a compound powder with a small particle diameter can uniformly be dispersed in the mixed powder, it can promote nitridation or carbonitridation when added in a quantity smaller than a pure material powder. Therefore, compound powders used as the catalyst serve as a resource saver and hence are advantageous as to the cost.

The catalyst may also comprise an alloy comprising, as constituent components, two or more elements selected from the group consisting of alkali earth metals, VIIA-group elements, and VIII-group elements. Examples of such an alloy are Mg—Ni, Ca—Co, and Mg—Fe alloys.

The material powder, the powdery carbon material, and the catalyst are mixed under such conditions that W, Cr, at least one of Ti, Zr, and Hf, and at least one of V, Nb, and Ta generate an alloy by way of mechanical alloying. Specifically, the material powder, the powdery carbon material, the catalyst, and steel balls are placed in a water-cooled container of an attritor, and then the water-cooled container is sealed. Then, rotary vanes inserted in the water-cooled container are rotated to grind and press the metal powder particles under high energy, producing an alloy powder. At the same time, the reducing agent and the catalyst are dispersed substantially uniformly in the alloy powder.

The mixed powder containing the alloy powder thus produced is then heat-treated in the presence of a nitrogen gas in the heat treatment step S2. The nitrogen gas may be contained in an atmosphere gas in a quantity capable of carbonitriding the alloy powder. Specifically, the atmosphere gas may be made up of the nitrogen gas only, or may comprise a mixture of the nitrogen gas and another inactive gas such as an argon gas or the like.

The mixed powder containing the alloy powder should preferably be heat-treated at a temperature in the range from 1000° C. to 1600° C. If the temperature were lower than 1000° C., then the carbonitridation would not progress efficiently. If the temperature were higher than 1600° C., then the rate of progress of the carbonitridation would not be increased, resulting in an increase in the cost of manufacture of the multicomponent ceramics.

In the heat treatment step S2, the oxide film formed on the surface of the alloy powder is reduced. Specifically, the surface of the alloy powder is covered with an oxide film that is produced when the metal of the alloy powder is oxidized by oxygen in the air. The oxide film is reduced by the powdery carbon material, making the alloy powder active.

When the oxide film is reduced, the powdery carbon material is oxidized into CO or $CO_2$ by depriving the oxide film of oxygen. Since CO or $CO_2$ is in a gaseous phase, it can easily and quickly be discharged together with the atmosphere gas out of the reaction furnace. As the oxide gas does not remain unremoved on the alloy powder, a highly pure multicomponent ceramics powder is produced.

The surface of the alloy powder is rendered highly active when the oxide film formed thereon is reduced. Therefore, the excessive powdery carbon material acts as a C source and the nitrogen contained in the atmosphere gas as an N source, with the result that the carbon powder is carbonitrided from its surface to inner structure.

In the heat treatment step S2, the catalyst may possibly be oxidized. Specifically, the multicomponent ceramics powder produced in the heat treatment step S2 contains an unreacted catalyst and a catalyst oxide as impurities. If a sintered material is produced from the multicomponent ceramics powder containing those impurities, then the sintered body may exhibit a low hardness.

In the acid treatment step S3, it is preferable to separate and remove the impurities from the multicomponent ceramics powder. Specifically, the multicomponent ceramics powder is immersed in an acid solution to elute the impurities from the multicomponent ceramics powder.

The acid solution should preferably contain hydrofluoric acid or fluoroboric acid as these acid solutions are highly capable of dissolving the above impurities and hence can efficiently separate and remove the impurities from the multicomponent ceramics powder.

In the acid treatment step S3, some of the metal elements of the multicomponent ceramics powder may possibly be oxidized. As described above, the hardness of the sintered body made of a powder in which the proportion of O exceeds 0.5 weight % is lowered. Therefore, the concentration of the acid solution and the immersion time in the acid solution are selected such that the proportion of O does not exceed 0.5 weight %.

After the multicomponent ceramics powder is separated from the acid solution by filtering, the multicomponent ceramics powder is neutralized and rinsed with water. In this manner, a highly pure multicomponent ceramics powder is produced.

The sintered body made of the multicomponent ceramics powder exhibits a high hardness as the multicomponent ceramics powder has been nitrided or carbonitrided from its surface to inner structure. Inasmuch as impurities have been removed from the multicomponent ceramics powder, the relative density of the sintered body is close to a theoretical density. Therefore, the sintered body is excellent as to strength and toughness.

As described above, a multicomponent ceramics powder can easily and simply be manufactured by mixing a W source, a Cr source, at least one of a Ti source, a Zr source, and an Hf source, at least one of a V source, an Nb source, and a Ta source, an Al source if necessary, a powdery carbon material, and a catalyst, and then heat-treating the mixed powder in the presence of a nitrogen gas. The above manufacturing method has a higher reaction efficiency and a higher reaction rate than the PVD process and the CVD process. Therefore, the amount of the multicomponent ceramics powder per batch is large, and the cost with which to manufacture a sintered body of the multicomponent ceramics powder is lowered.

The sintered body may be used in applications including a cutter such as a tip, a cutting tool, or the like, a mold, etc.

INVENTIVE EXAMPLE 1

1. Characteristics of a Sintered Body:

A W powder, a Cr powder, at least one of a hydrogenated titanium powder, a hydrogenated zirconium powder, and an Hf powder, and at least one of a hydrogenated vanadium powder, an Nb powder, and a Ta powder were used as a material powder, and carbon black in an amount ranging from 3.0 weight % to 11.5 weight % was added to 100 weight % of the material powder. Al in an amount equal to or smaller than 3 weight % was added, if necessary, to the material powder. Mg, Mg, and Ni were added as a catalyst, and mixed together with the material powder. They were mixed under such conditions that W, Cr, at least one of Ti, Zr, and Hf, at least one of V, Nb, and Ta, and Al, if added, are alloyed by way of mechanical alloying.

Figure 2:
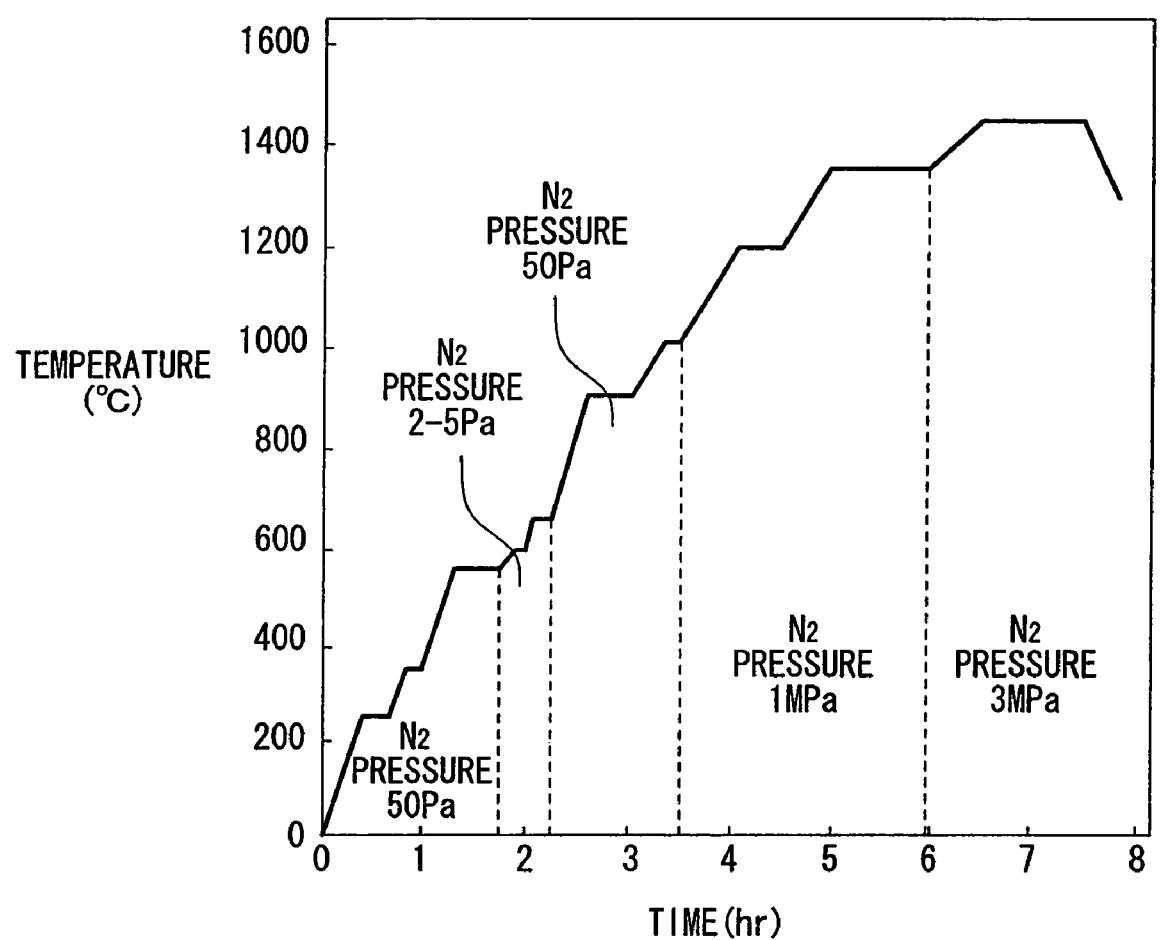
FIG. 2 is a diagram showing a sintering pattern in a heat treatment process in the production of the multicomponent ceramics powder according to the first embodiment.

The alloy powder in the mixed powder thus produced was carbonitrided by being heat-treated according to a pattern shown in FIG. 2 in a nitrogen atmosphere, thus providing various multicomponent ceramics powders.

The multicomponent ceramics powders were immersed in a mixed solution of aqua regia or hydrofluoric acid and nitric acid, and refined by eluting unreacted Mg, Mn, Ni and their oxides into the acid solution. The multicomponent ceramics powders were then sintered into sintered bodies, and measured for Vickers hardness. The sintered bodies are referred to as Inventive Examples 1 through 28 and Comparative Examples 1 through 4, respectively.

The composition ratios of the constituent components of the sintered bodies in Inventive Examples 1 through 28 and Comparative Examples 1 through 4, and their Vickers hardnesses (Hv) and Young's moduli are shown in FIG. 3. The sintered bodies with higher Young's moduli are higher in rigidity. It is clear from FIG. 3 that the sintered bodies in Inventive Examples 1 through 28 exhibit very high hardness and rigidity, and the hardness of a sintered body is lowered if the composition ratio of W is less than 62 weight %. It can also be seen that the hardness of a sintered body is increased by adding Al.

The powder of Inventive Example 26 and a Co powder were mixed at ratios of 90:10 (weight ratio) and 93:7, and the mixed powders were sintered into composite sintered bodies (hereinafter referred to as inventive sintered bodies 1, 2). For comparison, a mixed powder produced by mixing a WC powder and a Co powder at a ratio of 90:10 and a mixed powder produced by mixing a WC powder, a TaC powder, an NbC powder, and a Co powder at a ratio of 90:1:2:7 were sintered into composite sintered bodies (hereinafter referred to as comparative sintered bodies 1, 2). The above sintered bodies were measured for Vickers hardness, disruptive strength, and fracture toughness.

Specifically, the composite sintered bodies were cut off centrally thereacross, and the cut surfaces were polished to a mirror finish. Then, the cut surfaces were measured for Vickers hardness. The Vickers hardness of the inventive sintered body 1 was in the range from 2400 to 2500, and the Vickers hardness of the inventive sintered body 2 was in the range from 2400 to 3000. The Vickers hardness of the comparative sintered body 1 was in the range from 1300 to 1340, and the Vickers hardness of the comparative sintered body 2 was in the range from 1550 to 1580. Therefore, the Vickers hardnesses of the comparative sintered bodies 1, 2 were smaller than the Vickers hardnesses of the inventive sintered bodies 1, 2.

Test pieces prescribed in the process of measuring disruptive strength according to JIS were cut out of the composite sintered bodies and measured for disruptive strength. The disruptive strengths of the inventive sintered bodies 1, 2 were 2.9 GPa and 2.4 GPa, respectively, and the disruptive strengths of the comparative sintered bodies 1, 2 were 2.8 GPa and 2.2 GPa, respectively. Therefore, it is confirmed that the disruptive strengths of the inventive sintered bodies 1, 2 were better than the disruptive strengths of the comparative sintered bodies 1, 2.

The sintered bodies were also measured for fracture toughness according to the IF method. The fracture toughnesses of the inventive sintered bodies 1, 2 were 20 MPam$^{1/2}$ and 13 MPam$^{1/2}$, respectively, and the fracture toughnesses of the comparative sintered bodies 1, 2 were of smaller values of 14 MPam$^{1/2}$ and 7 MPam$^{1/2}$, respectively.

It is evident from the above results that it is possible to produce a sintered body which is highly hard and rigid without impairing strength, from a multicomponent ceramics powder.

The sintered bodies were separately measured for Young's modulus. The Young's moduli of the inventive sintered bodies 1, 2 were 540 GPa and 510 GPa, respectively, and the Young's moduli of the comparative sintered bodies 1, 2 were 570 GPa and 610 GPa, respectively, which are slightly greater than the Young's moduli of the inventive sintered bodies 1, 2. However, the Young's moduli (rigidity) of the inventive sintered bodies 1, 2 are sufficient for them to be used as cutters and dies.

2. Cutting Capability as Cutters:

The multicomponent ceramics powder of Inventive Example 26, a TaC powder, an NbC powder, and a Co powder were mixed at a ratio of 91:1:1:7, and then sintered into an inventive negative tip having an inscribed circle diameter of 12.7 mm and a thickness of 4.76 mm. For comparison, a comparative negative tip 1 different from the inventive negative tip except that a WC powder was used in place of the multicomponent ceramics powder and having the same dimensions as the inventive negative tip was prepared.

Figure 4:
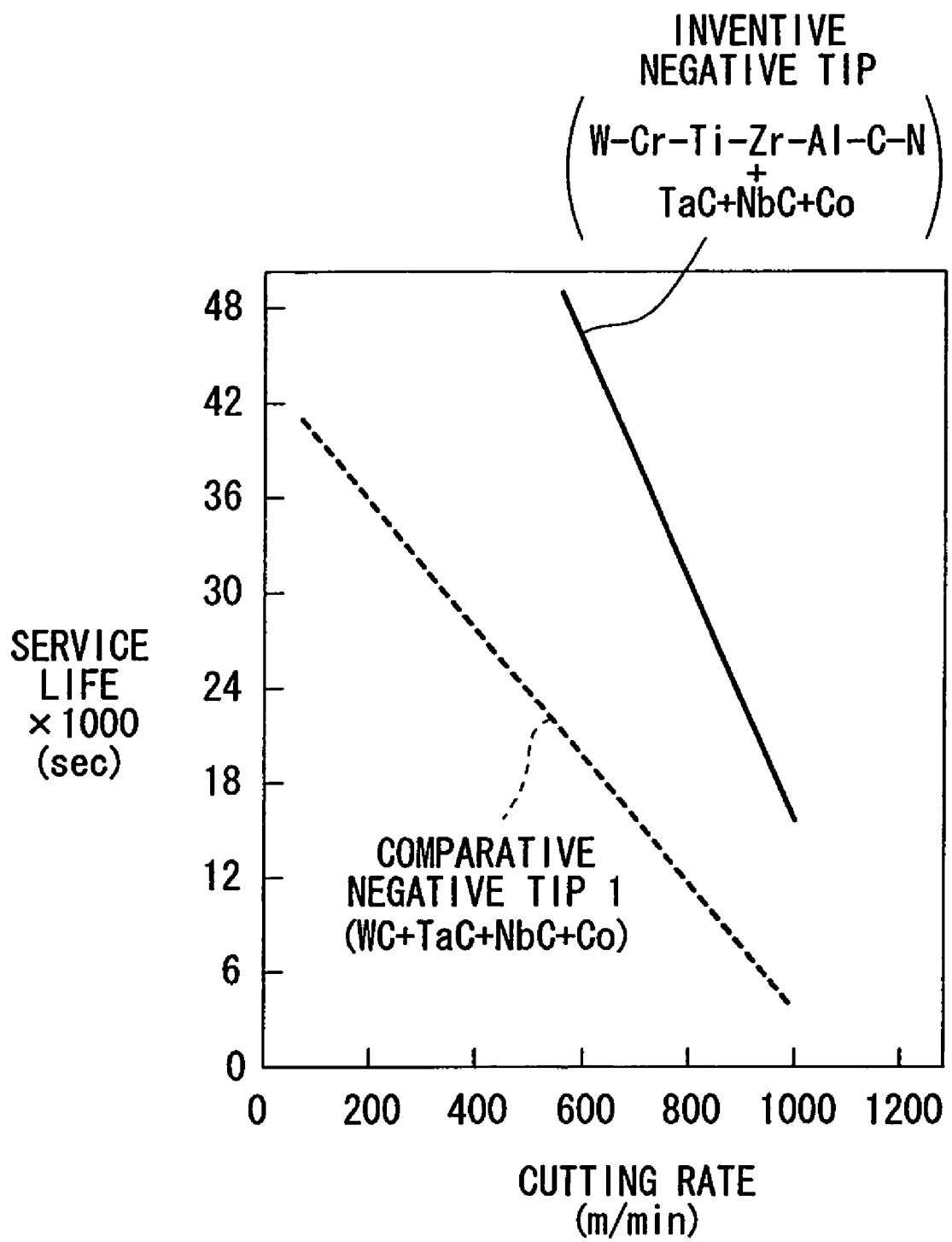
FIG. 4 is a graph showing the relationship between the cutting rate and service life of a negative tip mainly comprising a multicomponent ceramics powder and a negative tip mainly comprising WC, which were used to cut an AC8B material.
Figure 5:
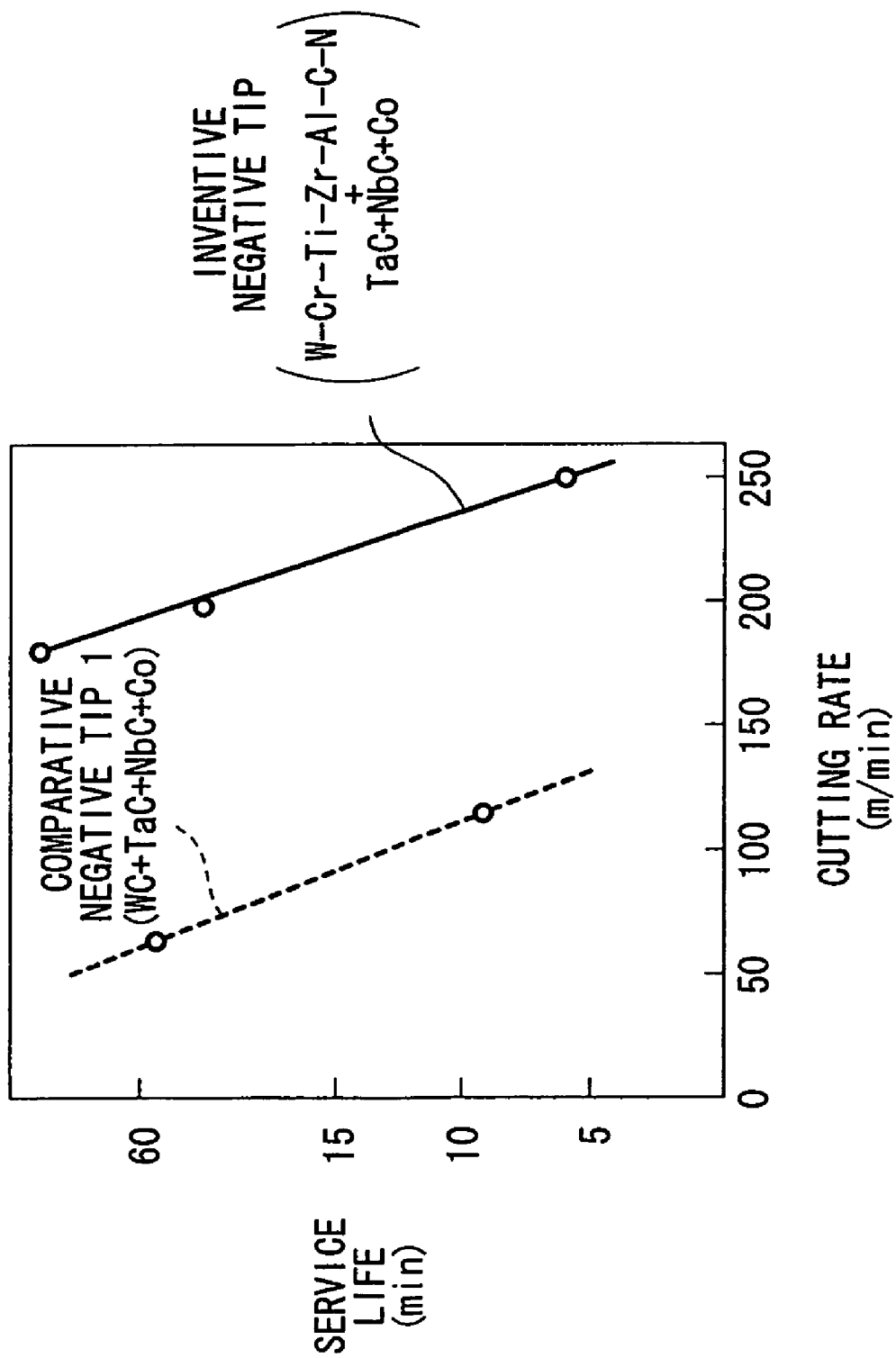
FIG. 5 is a graph showing the relationship between the cutting rate and service life of a negative tip mainly comprising a multicomponent ceramics powder and a negative tip mainly comprising WC, which were used to cut an FC250 material.

The above negative tips were used to continuously form holes having a depth of 2 mm in an AC8 material (high silicon aluminum alloy material) or an FC250 material (cast iron material) at a feed speed of 0.26 mm/revolution and various cutting rates, and the relationship between the cutting rate and the time required until the negative tips were worn by 0.3 mm was checked. The results are shown in FIGS. 4 and 5. It can be seen from FIGS. 4 and 5 that the inventive negative tip had much better wear resistance and a longer service life.

As the machining process using the comparative negative tip 1 progressed, a built-up edge was formed on the comparative negative tip 1, and, as a result, the dimensional accuracy of the formed hole was lowered. During the machining process using the inventive negative tip, no built-up edge was formed on the inventive negative tip, and the hole was formed accurately by the inventive negative tip.

A comparative negative tip 2 (commercially available product) comprising five layers of TiN, $Al_2O_3$, TiC, TICN, and TiN successively deposited on the surface of a material under JIS P10, and a comparative negative tip 3 (commercially available product) comprising a layer of Ti—Al—N3 three-component nitride deposited on the surface of a material under JIS P10 were prepared. Using these negative tips, a cutting test was conducted to continuously form a hole having a diameter of 2 mm in an SCM435 material (steel material) whose Rockwell hardness is 48, and the amount of wear on a clearance surface with respect to the cut length was checked. The cutting conditions include a cutting rate of 230 mm/min. and a feed speed of 0.26 mm/revolution. The results of the cutting test, together with the results of the inventive negative tip, are shown in FIG. 6.

Figure 6:
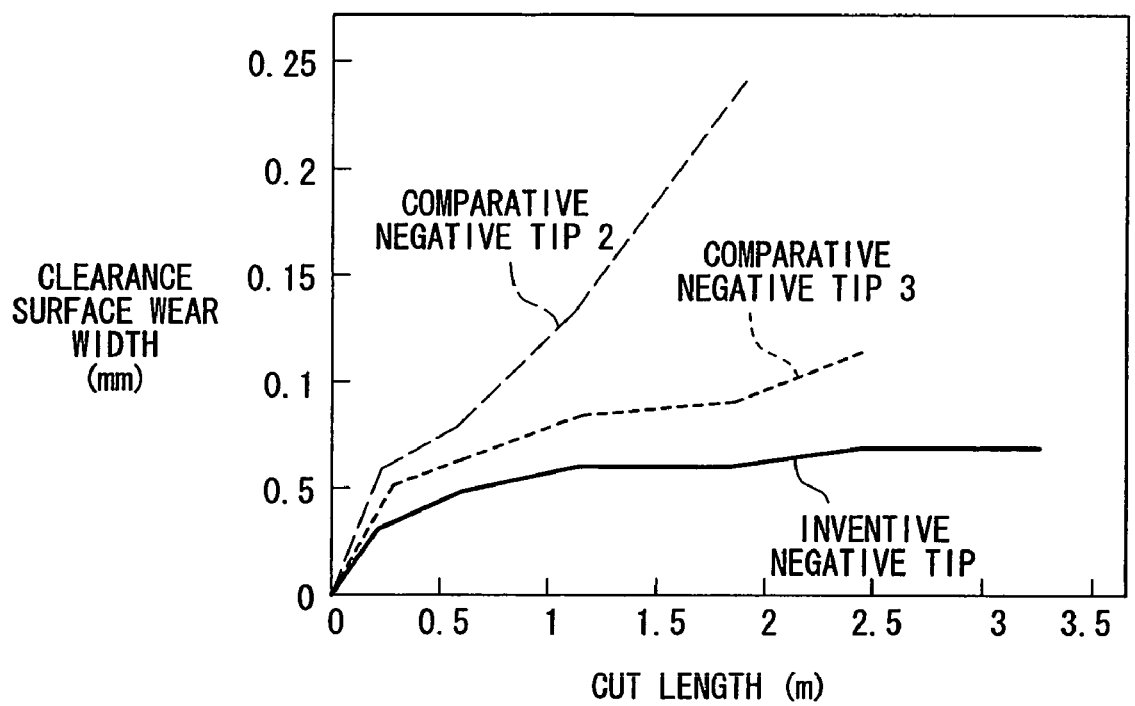
FIG. 6 is a graph showing the relationship between the cutting rate and service life of a negative tip mainly comprising a multicomponent ceramics powder and a negative tip with a hard layer on its surface, which were used to cut an SCM435 material.

It is apparent from FIG. 6 that the inventive negative tip was worn less than the comparative negative tips 2, 3 though no hard layer was formed on the surface of the inventive negative tip, i.e., had better wear resistance and a longer service life. The reason for this is considered to result from the fact that the inventive negative tip was made of multicomponent carbonitride ceramics having a large dissociation energy.

A method of manufacturing a powder of nitride ceramics comprising, as constituent elements, at least two metal elements selected from the group consisting of Ti, Al, V, Nb, Zr, Hf, Mo, Ta, Cr, and W, and also N, or a powder of carbonitride ceramics comprising as constituent elements, at least two metal elements selected from the above group and also N and C, and a method of manufacturing a sintered body containing the above nitride ceramics or the above carbonitride ceramics, according to a second embodiment of the present invention will be described below.

The second embodiment differs from the first embodiment in that W and Cr are not included as indispensable components.

Figure 7:
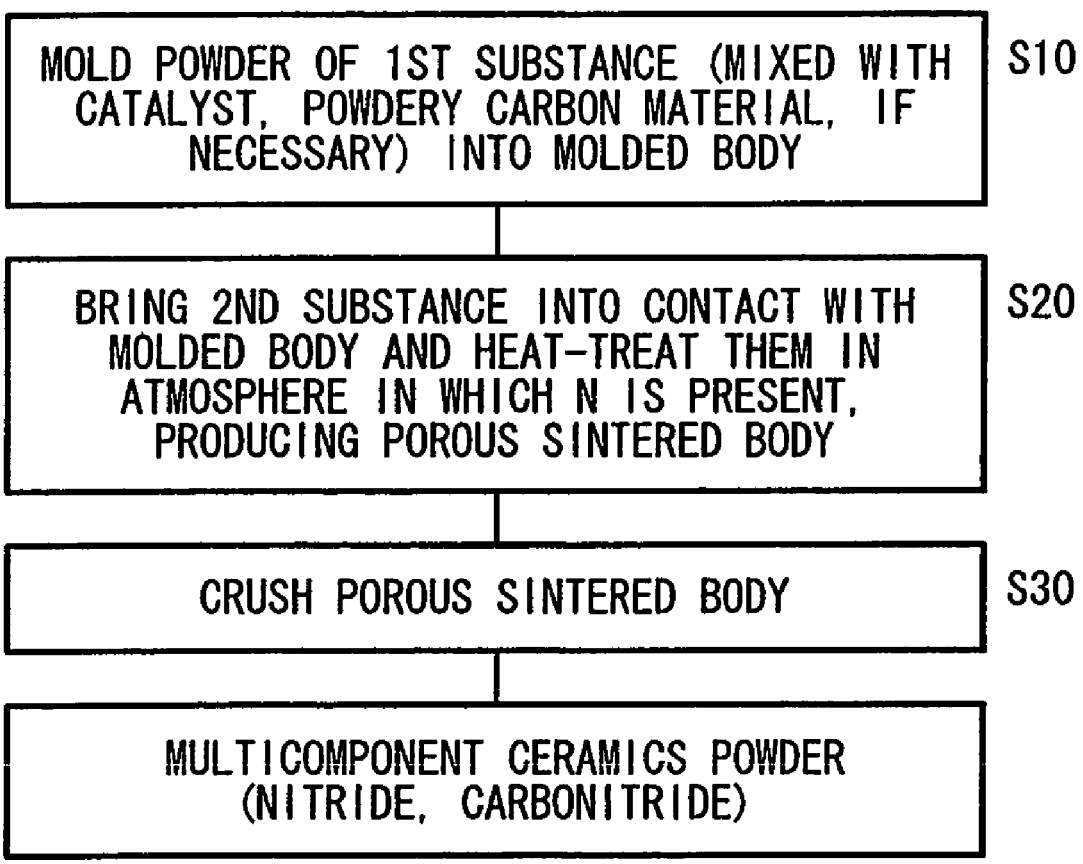
FIG. 7 is a flowchart of a method of manufacturing a multicomponent ceramics powder according to a second embodiment of the present invention.

A method of manufacturing a multicomponent ceramics powder according to the second embodiment will be described below with reference to FIG. 7. The method of manufacturing the multicomponent ceramics powder comprises a molding step S10 of molding a material powder into a molded body, a heat treatment step S20 of heat-treating the molded body into a porous sintered body of multicomponent ceramics, and a crushing step S30 of crushing the porous sintered body.

In the molding step S10, a molded body of a first substance is produced.

A material powder selected as a raw material of the molded body may be of pure metal, an alloy, or a compound insofar as it is a powder of a substance comprising at least one of Ti, Al, V, Nb, Zr, Hf, Mo, Ta, Cr, and W as a constituent element. For example, a Ti powder, a TiC powder, a TiN powder, a Ti (C, N) powder, a $TiO_2$ powder, an organic Ti compound powder, or the like may be used as a substance comprising Ti as a constituent element, and a W powder, a W—Ti alloy powder, a $W_2O_3$ powder, a WC powder, or the like may be used as a substance comprising W as a constituent element. Nitrides, carbides, and carbonitrides are particularly preferable as multicomponent ceramics can easily be produced therefrom.

The raw material powder may be a powder of one kind or a mixed powder of two or more powders, such as a mixed powder of a WC powder, a TiC powder, and an NbC powder. That is, the first substance may be of a single kind or may be a mixture.

To the first substance, it is preferable to add a catalyst for promoting nitridation or carbonitridation. Preferred examples of the catalyst include alkali earth metals, VIIA-group elements, and VIII-group elements. Mn is an example of a VIIA-group element and Fe, Co, and Ni are examples of VIII-group elements. Of these metals, Mn is preferable as it is the most effective to promote nitridation or carbonitridation of the above metal elements.

The preferred proportion of the catalyst is not uniquely determined as it varies from catalyst type to catalyst type. For example, if Mn is used as the catalyst, then its proportion should preferably be 3 weight % or less, and if Fe, Co, or Ni is used as the catalyst, then its proportion should preferably be 5 weight % or less. If the catalyst were added in excess of the above proportion, then the amount of an unreacted catalyst or the amount of a generated nitride or carbonitride would be increased, making it not easy to increase the hardness of the sintered body.

The catalyst may alternatively comprise a compound rather than the pure materials of alkali earth metals, VIIA-group elements, and VIII-group elements. For example, Fe and Ni powders may be replaced with powders of carbonyl iron and carbonyl nickel. These compound powders have much smaller particle diameters than pure material powders. Since a compound powder with a small particle diameter can uniformly be dispersed in the mixed powder, it can promote nitridation or carbonitridation when added in a quantity smaller than a pure material powder. Therefore, compound powders used as the catalyst serve as a resource saver and hence are advantageous as to the cost.

After a resin, a paraffin, and wax are added as a binder to the powder of the first substance, the powder is pressed into a molded body by a pressure molding process or the like.

Alternatively, after a solvent such as ethyl alcohol or the like is added to the powder, a cavity of a mold having a passage may be filled with the mixed powder with the solvent added thereto, and the mixed powder and the solvent may be pressed by the mold. Immediately after the mixed powder and the solvent are pressed, the solvent first flows and is separated from the mixed powder, and becomes interposed between the mixed powder and the mold. As a result, the mixed powder is pressed substantially uniformly from the solvent, and hence the molded body as it is being formed from the mixed powder is prevented from cracking or being cut off. In the molding step, therefore, the mixed powder is first subjected to isotactic molding under the pressure from the solvent.

As the pressurization progresses, the solvent is discharged out of the cavity through the passage. Therefore, the mixed powder is then directly pressed by the mold. Since the solvent is discharged, the solvent does not prevent the mold from pressing the mixed powder.

In this case, it is not necessary to add a resin, a paraffin, and wax to the powder. Therefore, because no degreasing step is required, the multicomponent ceramics powder can be produced efficiently.

The molded body thus produced is then sintered into a porous sintered body in the heat treatment step S20. That is, pores are left in the molded body in the heat treatment step S20.

At this time, the surface of the molded body is surrounded by a member made of a second substance, so that the second substance is held in contact with the molded body. Alternatively, the molded body may be placed on a member made of the second substance. Further alternatively, the surface of the molded body may be coated with a powder of the second substance.

The second substance is a substance comprising, as a constituent element, a metal element which is not contained in the first substance. Specifically, if the molded body (the first substance) is produced by molding a mixed powder of a WC powder and a TiC powder, then the second substance may be a substance which does not comprise W or Ti as a constituent element, e.g., Al or an Al alloy, and the surface of the molded body may be coated with a powder of Al, an Al alloy, or the like. Alternatively, a member made of Al, an Al alloy, or the like may be disposed outside of the molded body.

If the second substance is a substance which allows an oxide film to be easily formed on its surface, such as Al, an Al alloy, or the like, then it is preferable to use a reducing agent for reducing the oxide film. The reducing agent should preferably comprise a powdery carbon material. In this case, C produced from the powdery carbon material as a source becomes a constituent element of the multicomponent ceramics.

The powdery carbon material may be mixed with a powder of Al or an Al alloy, and the mixture may be applied to the surface of the molded body. Alternatively, the powdery carbon material may be added in advance to a powder of the first substance, and the mixture may be molded into a molded body.

The molded body is heat-treated at such a temperature that the densification (sintering) of the powder of the first substance that makes up the molded body does not progress, and the constituent element of the second substance is diffused into the first substance. In the above example, the molded body is heated at about 1100 K.

The molded body is heated in an atmosphere in which N is present. Specifically, the molded body is heated in an atmosphere of $N_2$, $NH_3$, or a mixed gas of $N_2$ and $NH_3$. An inactive gas of Ar or the like may also be present in the atmosphere. It is preferable to use a gas of $N_2$ or a mixture of $N_2$ and an inactive gas since these gases can easily be handled.

When the molded body is thus heated, the oxide film formed on the surface of Al (the second substance) is reduced, exposing active Al on the surface. Therefore, Al can easily be diffused.

Specifically, in the heat treatment step S20, active Al is diffused into WC or TiC, and WC or TiC is compounded with N. As a result, four-component carbonitride ceramics represented by W—Al—C—N or Ti—Al—C—N is produced. A five-component carbonitride ceramics represented by W—Ti—Al—C—N may also be produced because WC and TiC are partly reacted. The porous sintered body thus contains the multicomponent ceramics described above.

If a powdery carbon material is used as the reducing agent, then the powdery carbon material is oxidized into CO or $CO_2$ by depriving the oxide film of oxygen. Since CO or $CO_2$ is in a gaseous phase, it can easily and quickly be discharged together with the atmosphere gas out of the reaction furnace.

The excessive powdery carbon material acts as a C source. Specifically, if the first substance is in the form of a powder of pure metal or a powder of nitride, then C produced from the powdery carbon material as a C source is compounded with the powder of pure metal or the powder of nitride, carbonizing as well as nitriding the first substance.

Finally, in the crushing step S30, the porous sintered body is crushed into a multicomponent ceramics powder. If the powder of the first substance remains unreacted in the multicomponent ceramics powder, then multicomponent ceramics powder and the powder of the first substance may be separated from each other by a known process such as sedimentation separation.

The multicomponent ceramics powder thus produced may be used as a preferred material for a cutter such as a tip, a cutting tool, or the like, a mold, etc. Specifically, the multicomponent ceramics powder is molded singly or in combination with a metal powder, and then sintered to produce a cutter, a mold, or the like which is highly hard.

Figure 8:
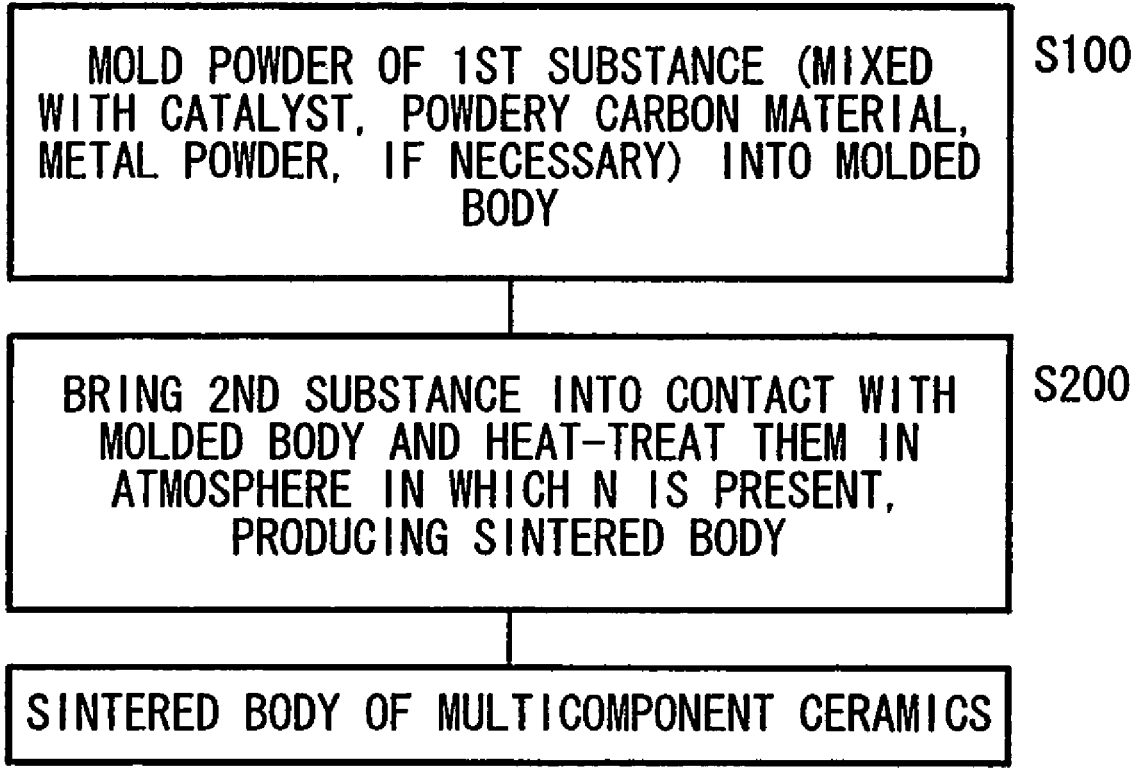
FIG. 8 is a flowchart of a method of manufacturing a multicomponent ceramics sintered body according to the second embodiment of the present invention.

A method of manufacturing a sintered body of multicomponent ceramics according to the second embodiment will be described below with reference to FIG. 8. The method of manufacturing a sintered body of multicomponent ceramics comprises a molding step S100 of molding a material powder into a molded body, and a sintering step S200 of sintering the molded body into a sintered body.

First, the molding step S100 is carried out. The molding step S100 may be carried out in the same manner as the molding step S10 of the method of manufacturing the multicomponent ceramics powder according to the second embodiment, and will not be described in detail below. If a composite of multicomponent ceramics and metal is to be produced, the powder of the first substance may be mixed with a powder of Fe, Co, Ni, or an alloy which comprises one or more of Fe, Co, and Ni as a constituent element.

Then, the molded body is sintered in the sintering step S200. The sintering step S200 may be carried in a manner similar to the heat treatment step S20 of the above method of manufacturing the multicomponent ceramics powder, except that the heating temperature is set to a temperature capable of sintering the powder of the first substance that makes up the molded body.

Specifically, the molded body is surrounded by a member made of a second substance, or a powder of the second substance is applied to the surface of the molded body, so that the molded body is held in contact with the second substance. In the production of the sintered body, a substance which comprises, as a constituent element, a metal element which is not contained in the first substance is selected as the second substance. A reducing agent may be added in the same manner as with the above method of manufacturing the multicomponent ceramics powder.

The molded body is then heated at a temperature which causes the powder of the first substance that makes up the molded body to be sintered. At the temperature at which the powder of the first substance is sintered, the constituent element of the second substance is easily diffused into the first substance. For example, if the molded body contains a WC powder and a TiC powder and the second substance is Al, then the heating temperature may be about 1700 K. The sintering step S200 is carried out in an atmosphere in which N is present as with the above method of manufacturing the multicomponent ceramics powder.

In the above example, Al is diffused into WC or TiC, and WC or TiC is compounded with N. As a result, four-component carbonitride ceramics represented by W—Al—C—N or Ti—Al—C—N is produced, or a five-component carbonitride ceramics represented by W—Ti—Al—C—N is produced. If the powder of the first substance and the metal powder are mixed with each other and then molded into a molded body, a sintered body produced by sintering the molded body is a composite of the multicomponent ceramics and the metal.

In the method of manufacturing the sintered body according to the second embodiment, as described above, it is possible to easily and simply produce a sintered body having a desired shape by sintering a molded body which has been molded to a shape depending on the intended use.

INVENTIVE EXAMPLE 2

3. Method of Manufacturing a Powder According to the Second Embodiment 85.5 parts by weight of a WC powder having an average particle diameter of 1 µm, 15 parts by weight of a TiC powder having an average particle diameter of 1.5 µm, 1 part by weight of a carbonyl nickel powder having an average particle diameter of 0.2 µm, and 0.5 part by weight of a Mg powder were mixed together in a solvent of ethyl alcohol. Then, after the solvent was adjusted to 3 parts by weight, the mixed powder together with the solvent was filled in a cavity of a mold having a passage. No binder was added.

While the solvent of ethyl alcohol was being discharged out of the cavity through the passage in the mold, the mixed powder was pressurized under 120 MPa, producing three cylindrical molded bodies each having a diameter of 40 mm and a length of 60 mm.

Then, the surface of one of the three cylindrical molded bodies was coated with a mixed powder comprising an Al powder and carbon black having an average particle diameter of 0.4 µm, mixed at a weight ratio of 1:3, to a thickness of 1 mm. The cylindrical molded body thus prepared will be referred to as Inventive Example 29. The surface of another one of the cylindrical molded bodies was coated with carbon black, and a tubular member made of a material (Al alloy) under JIS IN99 was brought into close contact with the circumferential side wall of the cylindrical molded body. The cylindrical molded body thus prepared will be referred to as Inventive Example 30. The surface of the remaining one of the cylindrical molded bodies was coated with carbon black, and the coated cylindrical molded body was placed on a bottom surface of a disk made of a material under JIS IN99 and having a diameter of 50 mm and a thickness of 10 mm. The cylindrical molded body thus prepared will be referred to as Inventive Example 31.

Figure 9:
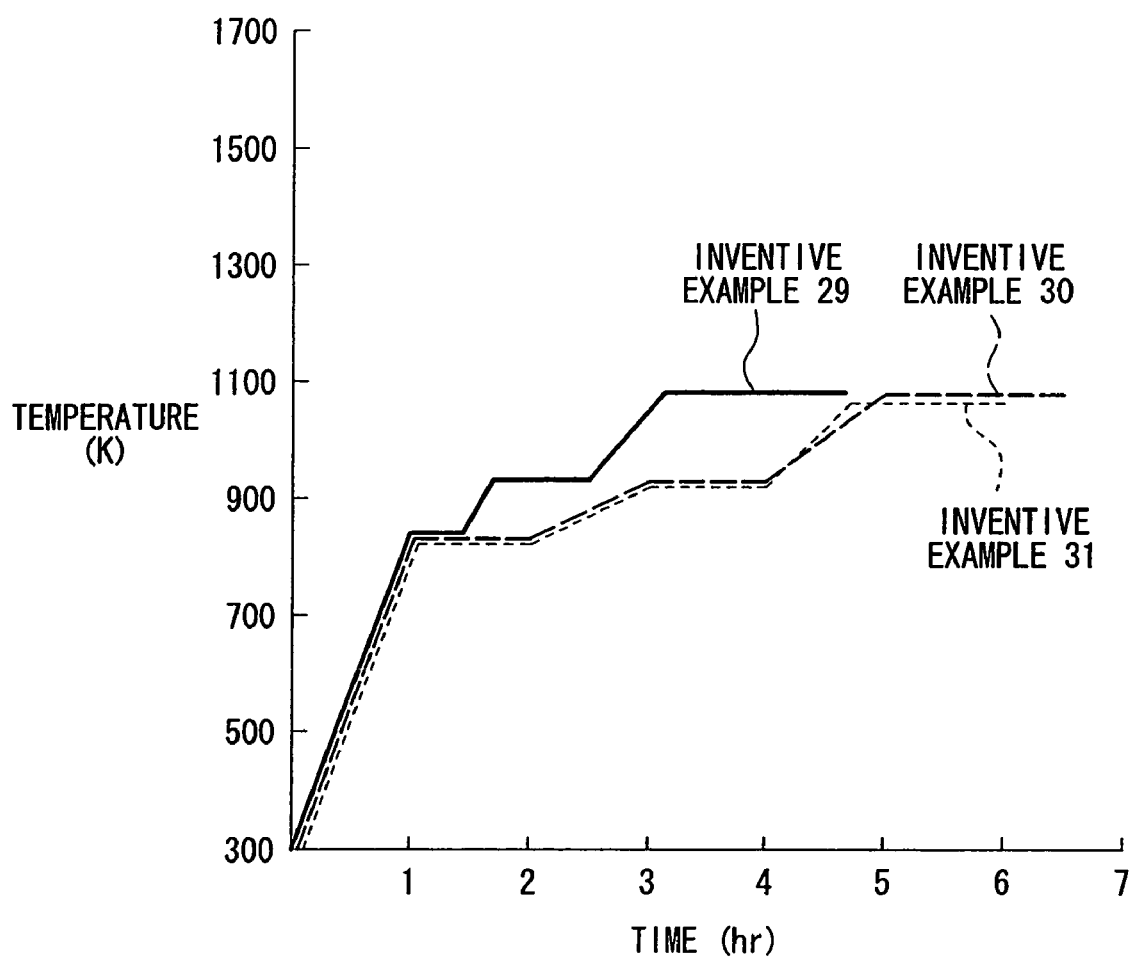
FIG. 9 is a diagram showing a sintering pattern in a heat treatment process in the production of porous sintered bodies according to Inventive Examples 29 through 31.

The cylindrical molded bodies according to Inventive Examples 29 through 31 were heat-treated in an $N_2$ atmosphere according to respective temperature-increasing patterns shown in FIG. 9, thus producing porous sintered bodies. In heat-treating the cylindrical molded bodies according to Inventive Examples 29 through 31, the temperature was increased in a reduced pressure until the temperature reached 950 K, and the pressure of the $N_2$ atmosphere was kept at 0.1 MPa after the temperature reached 950 K.

After the porous sintered bodies were covered with an epoxy resin, they were cut off along the diametrical direction of their bottoms, and then polished into specimens for electron microscope observation and X-ray diffraction measurement.

Figure 10:
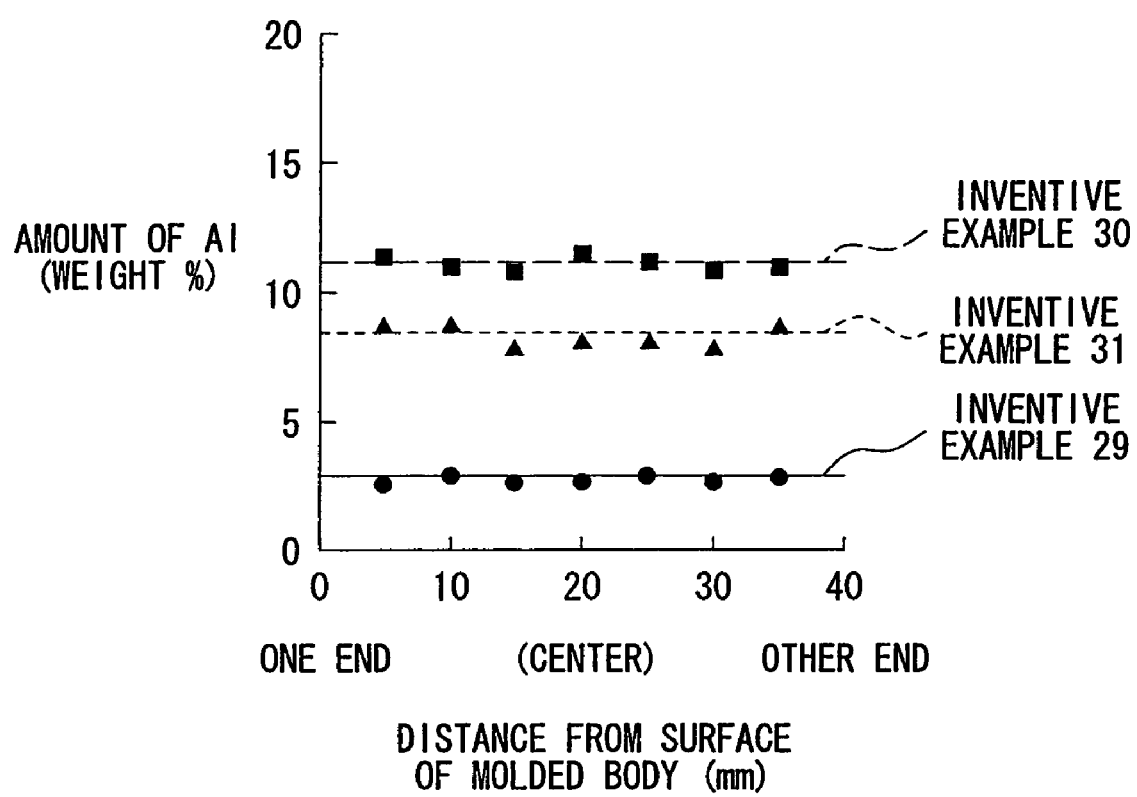
FIG. 10 is a graph showing the relationship between the diametrical distance from one end to the other at the bottoms of the porous sintered bodies according to Inventive Examples 29 through 31 and the concentration of Al therein.

FIG. 10 shows the relationship between the diametrical distance from one end to the other at the bottoms of the porous sintered bodies according to Inventive Examples 29 through 31 and the concentration of Al therein. It is clear from FIG. 10 that Al is dispersed substantially uniformly in the porous sintered bodies according to Inventive Examples 29 through 31.

The results of the X-ray diffraction measurement indicated that there appeared unknown peaks which were believed to belong to multicomponent ceramics. It follows, therefore, that a multicomponent ceramics powder can be produced by crushing the porous sintered bodies. No Al peaks appeared in the results of the X-ray diffraction measurement.

4. Method of Manufacturing a Sintered Body According to the Second Embodiment:

72.6 parts by weight of a WC powder having an average particle diameter of 1 µm, 15 parts by weight of a TiC powder having an average particle diameter of 1.5 µm, 3 parts by weight of an NbC powder having an average particle diameter of 1.5 µm, 2 parts by weight of a TaC powder having an average particle diameter of 1.5 µm, 7 parts by weight of a Co powder having an average particle diameter of 1.2 µm, and 0.2 part by weight of a carbonyl nickel powder having an average particle diameter of 0.2 µm were mixed together in a solvent of ethyl alcohol. Then, after the solvent was adjusted to 3 parts by weight, the mixed powder together with the solvent was filled in a cavity of a mold having a passage. No binder was added.

While the solvent of ethyl alcohol was being discharged out of the cavity through the passage in the mold, the mixed powder was pressurized under 120 MPa, producing three cylindrical molded bodies each having a diameter of 40 mm and a length of 80 mm.

Then, specimens were prepared in the same manner as with Inventive Examples 29 through 31. Specifically, the surface of one of the three cylindrical molded bodies was coated with a mixed powder comprising an Al powder and carbon black having an average particle diameter of 0.4 µm, mixed at a weight ratio of 1:3, to a thickness of 1 mm. The cylindrical molded body thus prepared will be referred to as Inventive Example 32. The surface of another one of the cylindrical molded bodies was coated with carbon black, and a tubular member made of a material (Al alloy) under JIS IN99 was brought into close contact with the circumferential side wall of the cylindrical molded body. The cylindrical molded body thus prepared will be referred to as Inventive Example 33. The surface of the remaining one of the cylindrical molded bodies was coated with carbon black, and the coated cylindrical molded body was placed on a bottom surface of a disk made of a material under JIS IN99 and having a diameter of 50 mm and a thickness of 10 mm. The cylindrical molded body thus prepared will be referred to as Inventive Example 34.

Figure 11:
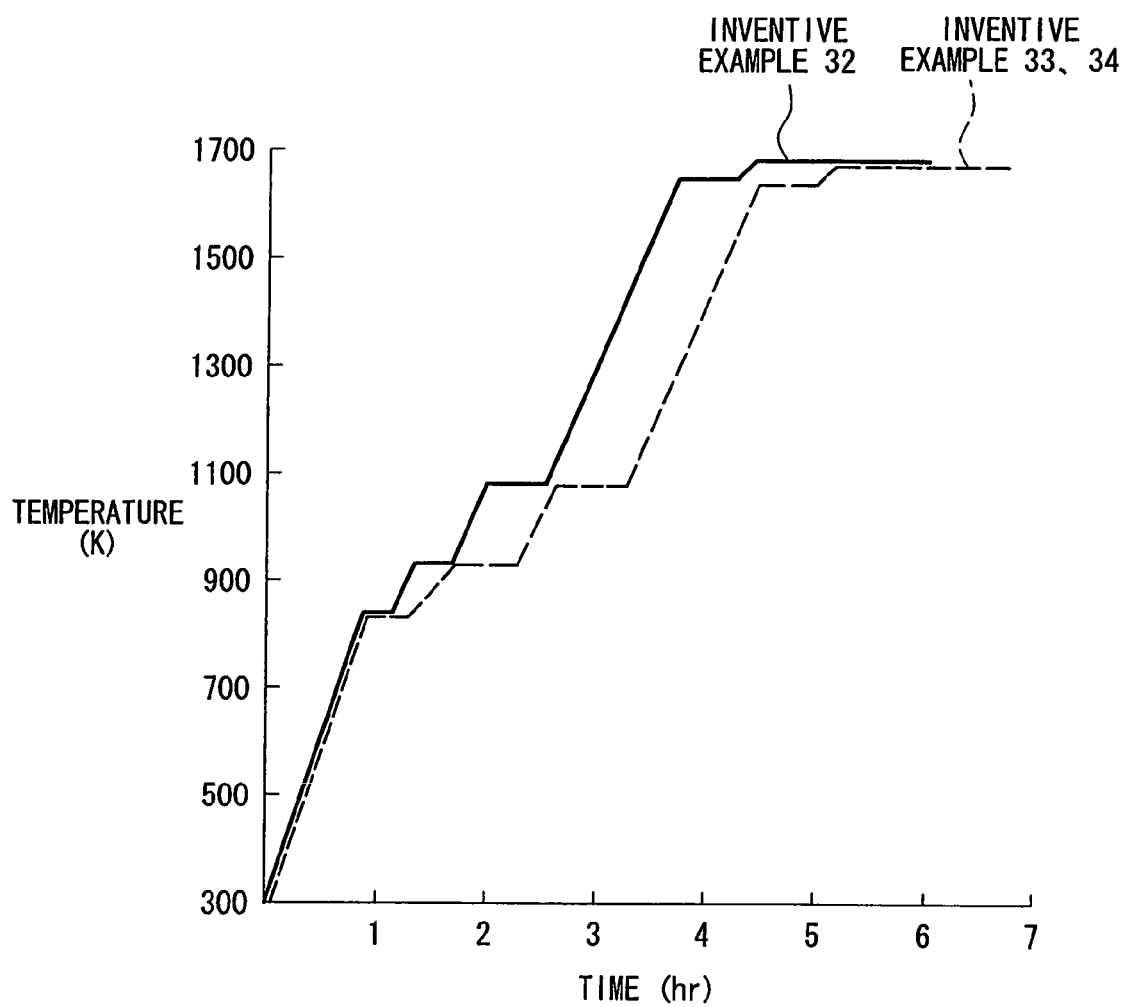
FIG. 11 is a diagram showing a sintering pattern in a heat treatment process in the production of porous sintered bodies according to Inventive Examples 32 through 34.

The cylindrical molded bodies according to Inventive Examples 32 through 34 were heat-treated in an $N_2$ atmosphere according to respective temperature-increasing patterns shown in FIG. 11, thus producing sintered bodies. In heat-treating the cylindrical molded bodies according to Inventive Examples 32 through 34, the temperature was increased in a reduced pressure until the temperature reached 950 K, and the pressure of the $N_2$ atmosphere was kept at 0.1 MPa after the temperature reached 950 K.

Figure 12:
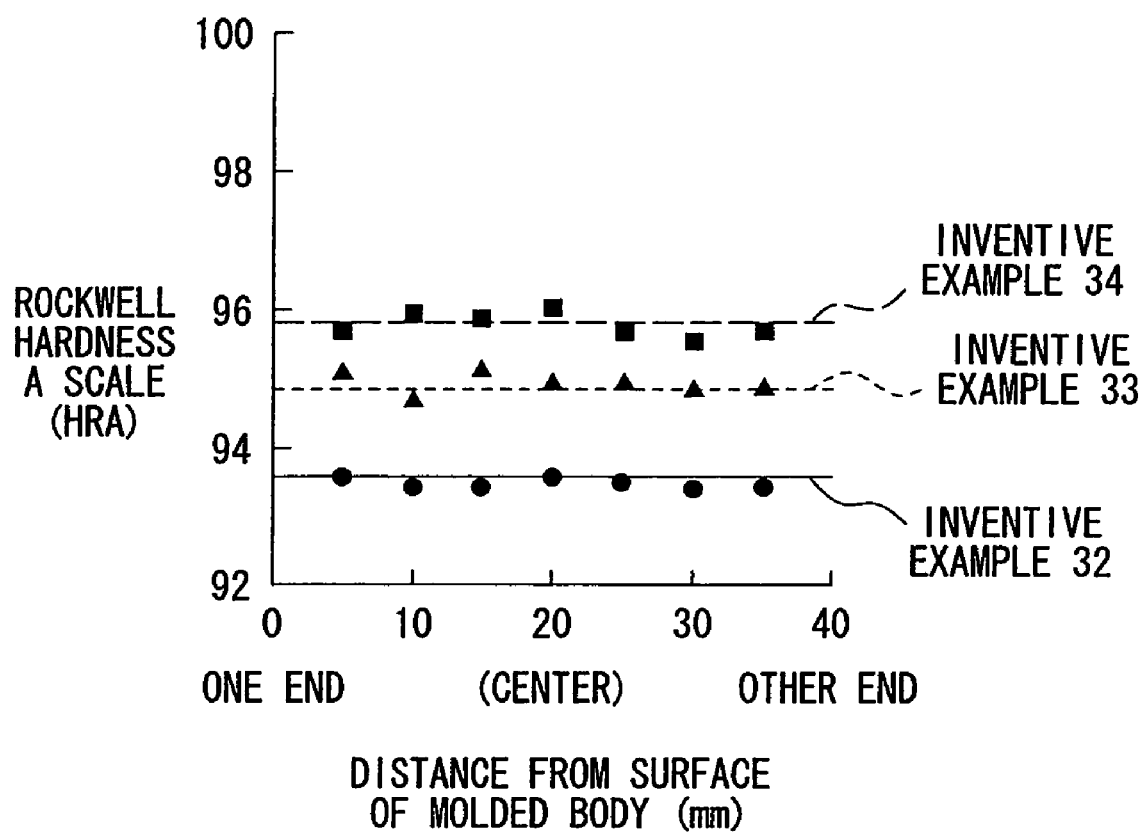
FIG. 12 is a graph showing the relationship between the diametrical distance from one end to the other at the bottoms of the porous sintered bodies according to Inventive Examples 32 through 34 and the Rockwell hardness A scale thereof.

The sintered bodies were cut off along the diametrical direction of their bottoms, and then polished, after which the Rockwell hardness ($H_{RA}$) A scale near the bottoms thereof was measured diametrically from one end to the other. The results are shown in FIG. 12. It is clear from FIG. 12 that the hardness of the sintered bodies according to Inventive Examples 32 through 34 is much higher than a WC sintered body and a TiC sintered body.

When the sintered bodies were subjected to X-ray diffraction measurement, unknown peaks appeared substantially at the same angle as with Inventive Examples 29 through 31. The unknown peaks support the belief that multicomponent ceramics was produced.

It was confirmed that almost no pores remained in each of the sintered bodies, and the relative densities of the sintered bodies were about 100%.

Although certain preferred embodiments of the present invention have been shown and described in detail, it should be understood that various changes and modifications may be made therein without departing from the scope of the appended claims.

What is claimed:

1. A method of manufacturing a multicomponent ceramics powder comprising, as constituent elements, at least two metal elements selected from the group consisting of Ti, Al, V, Nb, Zr, Hf, Mo, Ta, Cr, W, and N comprising the steps of:

molding a powder containing a powder of a first substance comprising either one of Ti, Al, V, Nb, Zr, Hf, Mo, Ta, Cr, and W as a constituent element, into a molded body;

heating said molded body, which is being held in contact with a second substance comprising, as a constituent element, a metal element which is either one of Ti, Al, V, Nb, Zr, Hf, Mo, Ta, Cr, and W and which is not contained in the powder of said first substance, in an atmosphere in which N is present, to diffuse the metal element as the constituent element of said second substance into said first substance and to compound the constituent element of said first substance with N, for thereby turning said molded body into a porous sintered body of multicomponent ceramics containing, as constituent elements, the metal element of said first substance, the metal element of said second substance, and N; and crushing said porous sintered body to turn said multicomponent ceramics into a powder.

2. A method according to claim 1, wherein said heating step comprises the step of heating said molded body in the presence of a powdery carbon material to compound the constituent elements of said multicomponent ceramics with C.

3. A method according to claim 1, wherein said first substance comprises a carbide, a nitride, or a carbonitride.

4. A method according to claim 1, further comprising the step of:

mixing a catalyst for promoting nitridation or carbonitridation with the powder of said first substance.

5. A method according to claim 4, wherein said catalyst comprises a substance comprising an alkali earth metal, a Group VIIA element, or a Group VIII element as a constituent element.

6. A method of manufacturing a sintered body containing multicomponent ceramics comprising, as constituent elements, at least two metal elements selected from the group consisting of Ti, Al, V, Nb, Zr, Hf, Mo, Ta, Cr, W, and N, comprising the steps of:

molding a powder containing a powder of a first substance comprising either one of Ti, Al, V, Nb, Zr, Hf, Mo, Ta, Cr, and W as a constituent element, into a molded body; and heating said molded body, which is being held in contact with a second substance comprising, as a constituent element, a metal element which is either one of Ti, Al, V, Nb, Zr, Hf, Mo, Ta, Cr, and W and which is not contained in the powder of said first substance, in an atmosphere in which N is present, to diffuse the metal element as the constituent element of said second substance into said first substance and to compound the constituent element of said first substance with N, for thereby sintering said molded body into a sintered body containing multicomponent ceramics comprising, as constituent elements, the constituent element of said first substance, the constituent element of said second substance, and N.

7. A method according to claim 6, wherein said heating step comprises the step of heating said molded body in the presence of a powdery carbon material to compound the constituent elements of said multicomponent ceramics with C.

8. A method according to claim 6, wherein said first substance comprises a carbide, a nitride, or a carbonitride.

9. A method according to claim 6, further comprising the step of:

mixing a powder of Fe, Co, Ni, or an alloy comprising at least one of Fe, Co, and Ni as a constituent element, with the powder of said first substance before molding said powder and sintering said molded body.

10. A method according to claim 6, further comprising the step of:

mixing a catalyst for promoting nitridation or carbonitridation with the powder of said first substance.

11. A method according to claim 10, wherein said catalyst comprises a substance comprising an alkali earth metal, a Group VIIA element, or a Group VIII element as a constituent element.

* * * * *